(12) United States Patent
Vosburgh et al.

(10) Patent No.: US 12,339,392 B2
(45) Date of Patent: Jun. 24, 2025

(54) DEVICES, SYSTEMS, AND METHODS FOR CANCELLATION BANDWIDTH-ADJUSTABLE NULLING OF INTERFERENCE

(71) Applicant: Archaius Inc., Durham, NC (US)

(72) Inventors: Frederick Vosburgh, Durham, NC (US); Kristopher McGuire, Raleigh, NC (US); Lee B. Baker, Raleigh, NC (US)

(73) Assignee: Archaius Inc., Durham, NC (US)

( * ) Notice: Subject to any disclaimer, the term of this patent is extended or adjusted under 35 U.S.C. 154(b) by 100 days.

(21) Appl. No.: 18/222,184

(22) Filed: Jul. 14, 2023

(65) Prior Publication Data
US 2024/0337724 A1    Oct. 10, 2024

Related U.S. Application Data

(60) Provisional application No. 63/447,771, filed on Feb. 23, 2023.

(51) Int. Cl.
*G01S 7/36* (2006.01)
*H01Q 3/26* (2006.01)

(52) U.S. Cl.
CPC ............. *G01S 7/36* (2013.01); *H01Q 3/2611* (2013.01)

(58) Field of Classification Search
CPC ........ G01S 7/36; G01S 19/21; G01S 7/2813; H01Q 3/2611; H04K 3/90
See application file for complete search history.

(56) References Cited

U.S. PATENT DOCUMENTS

| | | | |
|---|---|---|---|
| 5,440,308 A * | 8/1995 | Dybdal | H04B 1/126 342/19 |
| 6,590,528 B1 * | 7/2003 | DeWulf | G01S 19/36 342/383 |
| 6,847,328 B1 * | 1/2005 | Libonati | H01Q 9/0407 343/797 |
| 6,861,983 B2 | 3/2005 | Casabona et al. | |
| H2224 H * | 10/2008 | Madden | G01S 5/02216 342/442 |
| 7,733,288 B2 | 6/2010 | Williams | |
| 8,125,398 B1 | 2/2012 | Paulsen | |

(Continued)

FOREIGN PATENT DOCUMENTS

| | | | | |
|---|---|---|---|---|
| CN | 204856097 U | 12/2015 | | |
| CN | 111707447 A * | 9/2020 | ............ | G01M 11/02 |
| KR | 20170070816 A * | 12/2016 | | |

OTHER PUBLICATIONS

18222184_2024-12-09_CN_111707447_A_M.pdf, machine translation of CN-111707447-A (Year: 2020)*

(Continued)

*Primary Examiner* — William Kelleher
*Assistant Examiner* — Kenneth W Good
(74) *Attorney, Agent, or Firm* — NEO IP

(57) ABSTRACT

Anti-jamming arrays, systems, and methods are disclosed by forming cancellation nulls having an adjustable cancellation bandwidth and/or null depth to assure reception of position, navigation and timing, command and control, or other signals of interest. Signals are matched with respect to time difference of arrival (TDOA) and phase at a combiner to provide enhanced cancellation depth and bandwidth.

13 Claims, 9 Drawing Sheets

(56) References Cited

U.S. PATENT DOCUMENTS

| | | | |
|---|---|---|---|
| 8,965,319 B2* | 2/2015 | Wilkerson | H04B 1/10 |
| | | | 455/278.1 |
| 9,519,062 B2 | 12/2016 | Vosburgh et al. | |
| 10,581,155 B1* | 3/2020 | Gradinaru | H04B 1/109 |
| 10,735,037 B2 | 8/2020 | Floyd et al. | |
| 10,868,609 B1 | 12/2020 | Kossin et al. | |
| 2002/0015439 A1* | 2/2002 | Kohli | G01C 22/00 |
| | | | 375/150 |
| 2003/0031279 A1* | 2/2003 | Blount | H04B 1/525 |
| | | | 375/211 |
| 2012/0252392 A1* | 10/2012 | Wilkerson | H04B 1/10 |
| | | | 455/278.1 |
| 2017/0293265 A1* | 10/2017 | Salle | H03M 1/1009 |
| 2018/0375487 A1* | 12/2018 | Chen | H01P 9/006 |
| 2019/0372725 A1* | 12/2019 | Hongo | H04L 5/001 |
| 2022/0014205 A1* | 1/2022 | Petrov | H03L 7/1974 |
| 2022/0163676 A1 | 5/2022 | Amarnathan | |
| 2022/0285845 A1 | 9/2022 | Panther et al. | |

OTHER PUBLICATIONS

18222184_2024-12-10_KR_20170070816_A_M.pdf, machine translation of KR-20170070816-A (Year: 2016).*

* cited by examiner

DEVICES, SYSTEMS, AND METHODS FOR CANCELLATION BANDWIDTH-ADJUSTABLE NULLING OF INTERFERENCE

CROSS-REFERENCE TO RELATED APPLICATIONS

This application is related to and claims priority from the following US patents and patent applications: this application claims priority from U.S. Provisional Patent Application No. 63/447,771, filed Feb. 23, 2023. Each of the above applications is incorporated herein reference in its entirety.

BACKGROUND OF THE INVENTION

1. Field of the Invention

The present invention relates to isolation of radio frequency (RF) signals, and more specifically to controllable cancellation bandwidth nulling to protect wideband GPS and other RF signals of interest (SOI) from interference or jamming.

2. Description of the Prior Art

It is generally known in the prior art that cancellation can mitigate inadvertent or intentional (jamming) interference in desirably received radio frequency signals.

One example of the prior art is U.S. Pat. No. 8,965,319 for Methods and devices for reducing radio frequency interference by inventors Wilkerson, et al., filed Mar. 3, 2014 and issued Feb. 24, 2015, which is directed to using devices and methods of cancellation to selectively remove interference from radio frequency (RF) signals of interest (SOI) by feed-forward devices and methods.

U.S. Pat. No. 10,735,037 for Tunable filters, cancellers, and duplexers by inventors Floyd, et al., filed Mar. 27, 2019 and issued Aug. 4, 2020, is directed to use of passive mixers to cancel self-interference of wireless signals coupling into a receive antenna, thereby interfering with reception of SOI such as mobile phone signals, using a copy of the transmit signal, including distortion generated by the power amplifier, combined with the received signal to selectively cancel transmit signals and distortion.

U.S. Pat. No. 10,868,609 for Diversity polarization modulation by inventors Kossin, et al., filed May 30, 2018 and issued Dec. 15, 2020, is directed to a method including transmitting a digital code from a transmitter to a receiver. Information is transmitted via electromagnetic waves from the transmitter to the receiver. The transmission of the information includes transmitting a first portion of the information using electromagnetic waves with a first polarization in response to a first value of the digital code, and transmitting a second portion of the information using electromagnetic waves of a second polarization in response to a second value of the digital code. The first information may include a first navigational code and the second information may include a second navigational code.

U.S. Patent Publication No. 2022/0163676 for GNSS anti-jamming using interference cancellation by inventor Amarnathan, filed Jan. 8, 2021 and published May 26, 2022, is directed to systems and methods for GNSS anti-jamming using interference cancellation. The publication describes a system includes an antenna that receives signals, wherein the signals comprise a weak portion associated with one or more GNSS satellites and a strong interference portion from an interfering signal source. The system also includes a GNSS anti-jammer. The GNSS anti-jammer includes an interference canceller that receives the received signals and provides an estimated strong interference portion as an output. The GNSS anti-jammer also includes a summer that subtracts the estimated strong interference portion from the received signals to create a summed signal. Further, the GNSS anti-jammer includes a local noise remover that removes noise generated by the interference canceller from the summed signal, wherein the local noise remover is a processor that digitally removes the noise. Further, the system includes a GNSS receiver coupled to receive the summed signal from the processor.

U.S. Patent Publication No. 2022/0285845 for Anti-jamming and reduced interference global positioning system receiver methods and devices by inventors Panther, et al., filed May 24, 2022 and published Feb. 28, 2023, discloses methods and devices for anti-jamming and reduced interference in GNSS signals entering the receiver by reducing sensitivity to interference from a particular part of space, e.g. at or below the horizontal plane of the antenna.

U.S. Pat. No. 6,861,983 for Method and apparatus for reducing electromagnetic interference and jamming in GPS equipment operating in rolling environments by inventors Casabona, et al., filed Mar. 3, 2004 and issued Mar. 1, 2005, is directed to methods and devices for reducing interference in GPS reception during navigation over rolling terrain, compensating for the changes in vehicle attitude and, thereby, improving GPS reception. Devices comprise two antennas mounted in orthogonal orientations or polarizations to provide signals that can be co-processed to this end.

U.S. Pat. No. 7,733,288 for Passive anti-jamming antenna system and method by inventor Williams, filed Mar. 31, 2008 and issued Jun. 8, 2010, is directed to anti-jamming antenna system and methods using an external array of passive open circuited antennas arranged between an intended receiving antenna unit and interfering signals to absorb, or block, interference reaching the GPS receive antenna or array.

U.S. Pat. No. 8,125,398 for Circularly-polarized edge slot antenna by inventor Paulsen, filed Mar. 16, 2009 and issued Feb. 28, 2012, is directed to arrays of circularly-polarized slot antennas mounted with a dielectric resonator in an artillery shell or other munition as means of reducing GPS jamming in a structural implementation that can survive impulsive deployment.

U.S. Pat. No. 9,519,062, for Methods, systems, and computer readable media for mitigation of in-band interference of global positioning system (GPS) signals by inventors Vosburgh, et al., filed Feb. 28, 2013 and issued Dec. 13, 2016, is directed to methods, systems, and computer readable media for mitigation of in-band interference of global positioning system (GPS) signals discloses evanescent field devices and methods to cancel jamming before it enters the receive antenna vs. canceling it after the fact. While this invention provides deep nulls, time delay due to the system design results in cancellation bandwidth that is narrow relative to what is preferable for protecting wideband signals of interest.

The current disclosure of adjustable cancellation bandwidth anti-jamming devices and methods addresses the shortcomings of prior anti-jamming systems.

SUMMARY OF THE INVENTION

The present invention relates to anti-jamming systems for isolation of radio frequency (RF) signals of interest (SOI)

from interference (hereinafter "jamming") by selective cancellation, and, more specifically adjusting Time Difference of Arrival (TDOA) of antenna signals at a signal combiner for adjusting cancellation bandwidth.

In one embodiment, the system comprises a symmetric design in which a first antenna is connected to the first input of a combiner via a signal path comprising a controllable delay element and a phase rotator connected in series between the first antenna and the combiner, and at least one second antenna is connected to a second input of the combiner via a signal path comprising a controllable delay element and a phase rotator connected to series between the second antenna and the combiner. A power detector is connected between the output of combiner and the system controller, to the first signal path and the second signal path. The method comprises rotating phase according to the method described in U.S. Pat. No. 9,519,062, which is incorporated herein by reference in its entirety, together with setting TDOA according to a desired or predetermined cancellation bandwidth.

In another embodiment, the system comprises an asymmetric design in which the at least one second signal path differs from first signal path with respect to one or more of the components and/or propagation time.

In a third embodiment, the system comprises a plurality of stages in one embodiment comprising a first canceller and a second canceller, the outputs of which are connected to a third canceller in a cascade like design for providing additional cancellation of a first jammer or cancellation of a second jammer. This system is operable to be extended to additional stages for cancellation of a plurality of jammers.

In a fourth embodiment, the system comprises a cancellation bandwidth adjustable controlled radiation pattern array (CRPA) in which each signal path has a controllable delay element connected in series with a transversal filter that is further connected to the combiner. In some cases, a third signal path comprises a controllable switch for reversible interruption of propagation of a signal to the combiner.

Methods of CBW controlled CRP cancelling comprise space time adaptive processing (STAP) to form at least one spatial null which is combined with processing to adjust TDOA for adjusting CBW. In some cases, the method includes calculating jammer bearing according to the calculations as described in U.S. Pat. No. 9,519,062, using signals from a first antenna and a second antenna. Jammer direction of arrival is used to adjust for differences in jammer time of arrival at the separate antennas such as to improve jammer depth or bandwidth or their calculation.

These and other aspects of the present invention will become apparent to those skilled in the art after a reading of the following description and figures elucidating the invention.

DETAILED DESCRIPTION

Figure 1A:
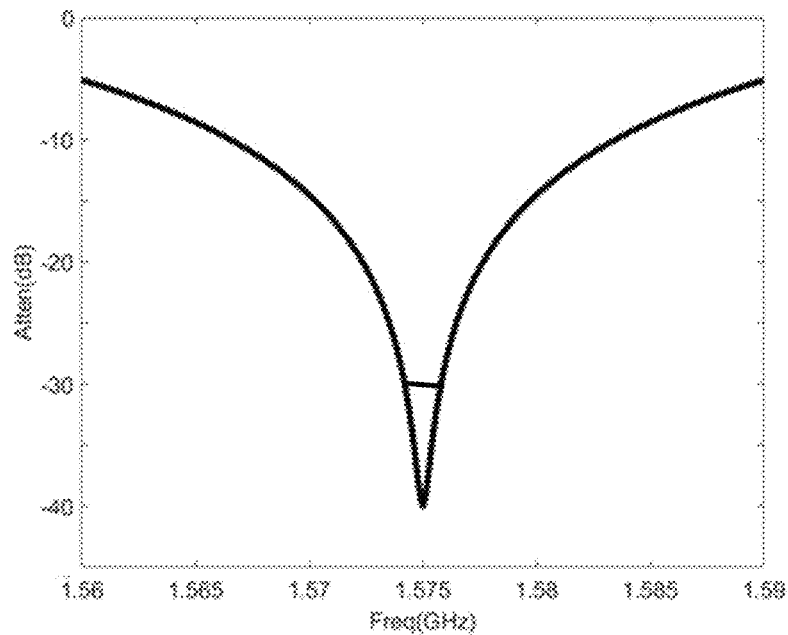
FIG. 1A is a null formed by cancellation when a TDOA is 6 nanoseconds.

The present disclosure is described according to the following definitions. A null is defined as reduced signal power at a plurality of frequencies, which commonly is provided by combining signals to provide selective jammer cancellation. Cancellation bandwidth (CBW) is defined as a range of frequencies over which interference is reduced at least to a desirable depth; adjusting of cancellation bandwidth is defined as modifying the frequency range over which desirable depth is provided. Time difference of arrival (TDOA) is defined here in terms of timing of antenna signals at a combiner vs. at the antennas. Programmable encompasses continuous, step-wise, switchable and selectable types of time delay element. A symmetric design is defined as having antenna paths of the same design; arrays comprising asymmetric or heterogeneous design are also acceptable.

Jammer bearing is the direction between an antenna or an antenna array and the source of a jamming signal, which is operable to be determined by or calculated from anti-jamming phase rotation as disclosed in U.S. Pat. No. 9,519,062. GPS is intended here to represent any radio frequency (RF) signal, such as from a radio transmitter or a 4G/5G mobile system tower in addition to signals from GPS satellites. It should be noted that many commercially available phase shifters approximate phase with a time delay which adversely effects cancellation bandwidth, which is cured by the present invention. Other than that phase, power, amplitude and delay are used as traditionally defined in the art. An antenna array is defined as having at least two elements. Controlled radiation pattern antenna (CRPA) refers to arrays of 3 or more antennas, such as 4 or 7 in common practice, connected to a combiner providing for cancelling GPS jamming. A CRPA signal path encompasses any type of circuit. Space time adaptive processing (STAP) is intended to cover any iterative feedback method of reducing jamming by modifying and combining signals from an array of antennas.

The term UAS, or drone, refers to an unpiloted air system. C-UAS refers to a RF transmitter used to disrupt reception by the UAS of GPS and/or command and control signals. A wideband signal of interest (SOI) is defined as comprising a plurality of contiguous frequencies such as covering 5 MHz or more. Wideband cancellation is defined as at least spanning the SOI bandwidth.

The present disclosure describes devices and methods for isolating radio frequency (RF) signals of interest (SOI) from jamming, and, more specifically, to adjusting cancellation bandwidth (CBW) by adjusting time differences of arrival (TDOA) of a plurality of antenna signals at a combiner, vs. at the individual antennas in an array.

A preferred embodiment of the invention is a jammer-cancelling antenna system of symmetric design. This system consists of a cancelling combiner connected to a first antenna via a first signal path and to at least one second antenna via an at least one second signal path, the first signal path providing a first antenna signal to the first combiner input and the second signal path providing a second antenna signal to a second combiner input of the combiner. The output of the combiner is connected to a detector that is operable to measure the amplitude or power of the combiner output signal. The signal detector is connected to a system controller which is also connected to at least one of the first signal path and the second signal path. The controller is any type that is operable to control phase rotation and/or delay of the first antenna signal and/or of the second antenna signal to relative phases and delays yielding a null of desirable depth and/or cancellation bandwidth.

One acceptable type of phase rotator (PR) is a commercially available or purpose built I/Q circuit, which in some cases, is also operable to adjust amplitude of its output signal. The PR preferably has a phase resolution of 0.001 degrees, 0.1 degrees although any value less than 5 degrees is also acceptable. Other phase shifters, such as a 4-port combiner, are also acceptable.

An illustrative controllable delay element is any type that is operable to provide a plurality of different time delays, preferably with a delay resolution of 2 picoseconds although other resolutions such as 20, 200 or 2,000 picoseconds or any in between are also acceptable. Controllable delay element preferably provides 32 or more different delays. One type of adjustable delay element comprises a switchable set of fixed delay lines; other types, e.g. varactors, are also acceptable.

The controller is any type that is operable to control TDOA between antenna signals to preferably within 2 picoseconds although other values less than 2 nanoseconds or 2 microseconds are also acceptable. The controller is any type that is operable to control amplitude and/or phase of a signal with a resolution better than 8 bits and preferably better than 11 bits, e.g. 16 or 24-bits.

In another illustrative embodiment, the system is of asymmetric design, such as one in which the second signal path comprises a controllable phase rotator and a fixed delay element, the delay by the fixed delay element being more or less equivalent to the intrinsic, or fixed delay, created by the programmable delay element in the first antenna signal path.

It will be appreciated that the present invention is operable to be used to isolate other RF SOI, such as video feeds, voice communications or data streams, from interference, a process referred to by defense and government offices as assured information sharing. As such, the current invention may be applied to isolate such signals from inadvertent or intentional interference.

One example of isolating other SOI from jamming is use of the present invention on UAS or other robots, and/or transceivers used by their operators, to cancel jamming, such as signals emitted by a Counter UAS (C-UAS) device, known informally as a drone gun, that is intended to disrupt UAS command and control links and/or the video feeds.

With navigation and information sharing now utilizing wideband transmissions, e.g. the M-code GPS signal and mobile phone waveforms, wideband cancellation of jamming is required to meet military requirements for assured position, navigation and timing (APNT) and assured information sharing (AIS). In light of these requirements, the present disclosure relates to wideband cancellation and to the control of cancellation bandwidth by adjusting TDOA.

The present disclosure also details amplitude matching and anti-phase aligning of the jammer contents of array antenna that is preferably substantially more precise than used in common practice to provide deeper nulls.

Figure 1B:
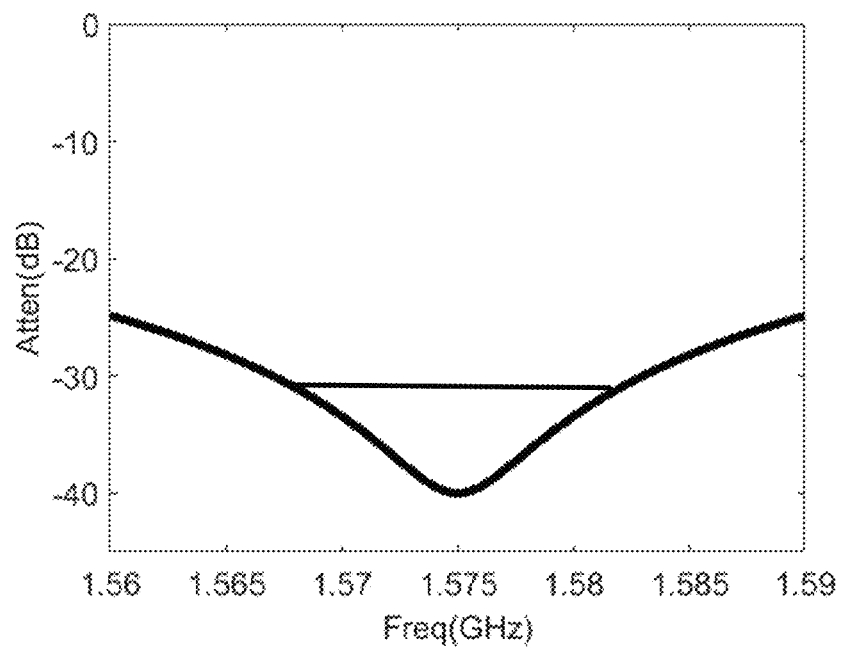
FIG. 1B is a null formed when TDOA is 600 picoseconds.
Figure 1C:
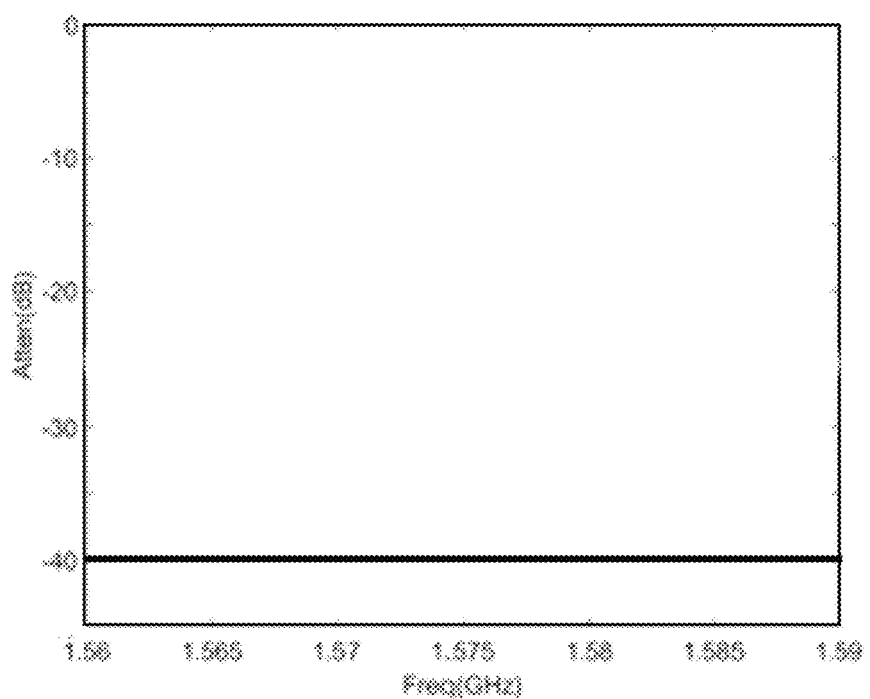
FIG. 1C is a null formed when TDOA is 2 picoseconds.

FIGS. 1A-C illustrate canceller nulls along with their characteristic depth and CBW. FIG. 1A illustrates a null with the narrow CBW generated by canceling signals with a TDOA of 6 nanoseconds. FIG. 1B depicts a null with the wider CBW generated when TDOA is 600 picoseconds. FIG. 1C presents a 3D plot of the null formed when TDOA is reduced to 2 picoseconds. This plot covers only 30 MHz, sufficient to demonstrate that CBW is of greater width than the M-code waveform. It can be inferred from flatness of null plot that CBW in this example is extremely wide, potentially wide enough to protect the entire frequency band for Wi-Fi at 2.4 GHz or a large portion of the Link-16/JTIDS band.

Figure 2:
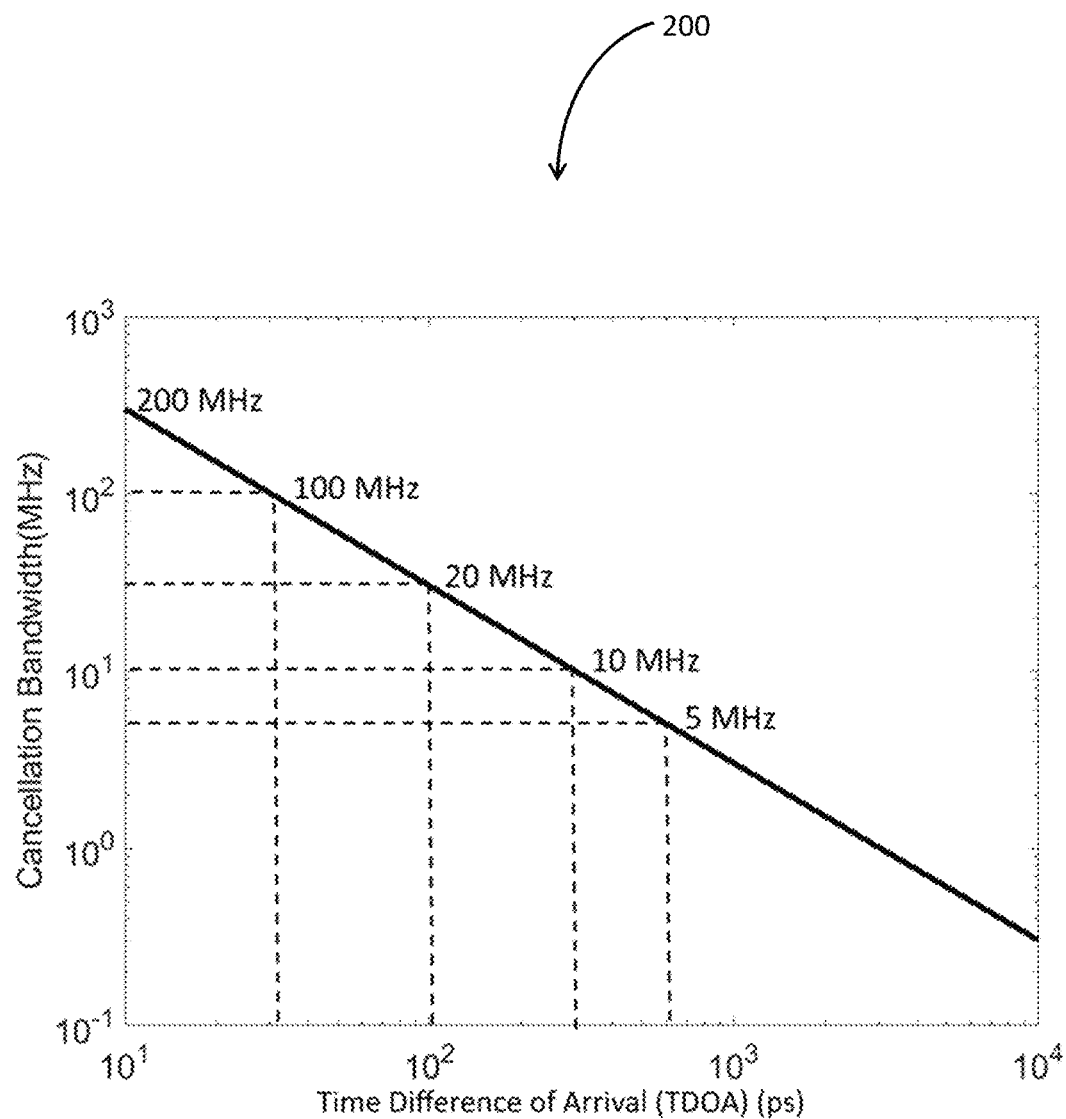
FIG. 2 plots the log-log relationship of CBW to TDOA.

FIG. 2 presents a log-log plot 200 of the dependence of CBW on TDOA over an illustrative range from 1 to 10,000 picoseconds, The plot is annotated to highlight the values of TDOA providing wideband anti-jamming for various current operating bandwidths, such as 10 MHz, 24 MHz or 100 MHz, the latter equivalent to the full width of the Wi-Fi band at 2.4 GHz.

With FIGS. 1 and 2 providing a frame of reference, we now describe representative devices and method for wideband and CBW-adjustable cancellation of GPS jamming or other types of RF interference.

Figure 3:
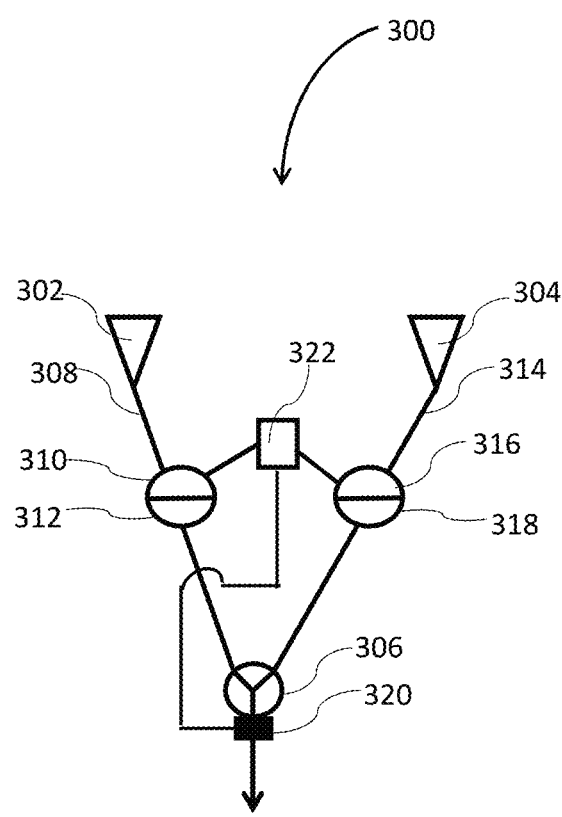
FIG. 3 illustrates a symmetric CBW-adjustable canceller.

FIG. 3 illustrates a canceller 300 of symmetric design, having a first antenna 302 and at least one second antenna 304. First antenna 302 is connected to a combiner 306 via a first signal path 308 that preferably incorporates an adjustable delay 310 connected in series with a phase rotator (PR) 312. Second antenna signal path 314 integrates a second delay element 316 connected in series with a PR 318. The output of the combiner 306 is connected to a power detector 320 that is further connected to the system controller 322, which is further connected to first signal path 308 and second signal path 314 for controlling at least one of signal delay and phase rotation.

Delay 310, 316 is any type that is operable to adjust time of propagation of a signal between an antenna and the combiner for controlling TDOA of antenna signals at the combiner 306. Delay 310, 316 preferably provides a selectable series of delays separated by 2 picoseconds although any separation between 1 and 1000 picoseconds is also acceptable. Delay 310, 316 preferably is a passive device although active types, e.g. varactors, are also acceptable. One acceptable controllable time delay element 310, 316, among others is the ARAR4001 sold by Analog Devices Inc. of Wilmington MA. Although delay elements 310, 316 are illustrated as connected between an antenna 302, 304 and phase rotator 312, 318, they are operable to be connected between PR 312, 318 and combiner 306.

PR 312, 318 preferably provides a resolution of 0.1 degrees although any resolution finer than 5 degrees is acceptable. PR 312, 318 preferably has a phase rotation range of 360 degrees although other ranges such as 180, 90, 27 degrees among other ranges are also acceptable. One acceptable PR 312, 318 is the AD8341 vector modulator sold by Analog Devices of Wilmington, MA. PR 312, 318 is controlled by DC offset signals provided to the I and Q inputs with a resolution of at least 10 bits, preferably or 24 bits among other resolutions. PR 312, 318 is any type that is operable to adjust amplitude of phase-rotated signals for precise amplitude equalization and, thereby, depth of the null created by cancellation. In some cases at least one signal path 308, 314 incorporates a coarse delay element (not shown) for adjusting TDOA separately or in conjunction with adjustment of delay element 310, 316 the coarse delay element is fixed or adjustable type, the adjustable type being connected to the controller 322. It will be appreciated, that a fixed or controllable coarse delay element is operable to be used to alter, by way of example but not limitation, to increase, the magnitude of TDOA and in some such cases to reduce CBW.

Adjusting CBW comprises determining the difference in TDOA of antenna signals at the combiner by any method and adjusting TDOA among antenna signals to provide a desirable CBW. One acceptable method is measuring the time of arrival of a plurality of signals at the combiner and determining the difference in arrival times. Another acceptable method comprises determining the direction of arrival of a jammer and using that direction and the spatial relationship among a plurality of antennas to compute TDOA values for signals from the antennas at the combiner and providing adjustments in propagation delay among the antenna signals to provide a desirable TDOA for providing a desirable value of CBW. A third method to search for TDOA values, such as by steepest descent or other feedback or feed-forward for determining TDOA values providing the desired value of CBW.

In some embodiments, an attenuator and/or a bandpass filter (not shown) is connected between an antenna 302, 304 and the PR 312, 318 to reduce signal power entering the PR 312, 318 to suppress distortion. In one embodiment, an amplifier (not shown) is connected between the PR 312, 318 and the combiner 306 to restore the strength of the signal before attenuation so that the first antenna signal and the second antenna signal are accurately amplitude matched when combined.

In one embodiment, the first antenna 302 and/or the second antenna 304 is a patch antenna. In one embodiment, the first antenna 302 and/or the second antenna 304 is replaced with one or more antennas (e.g., an antenna array) capable of detecting the direction of an incoming signal. In one embodiment, the one or more antennas are operable to communicate with a controller adjusting a time delay, amplitude adjustment, and/or phase adjustment in the first signal path or the at least one second signal path in order to enhance anti-jamming capabilities.

Figure 4:
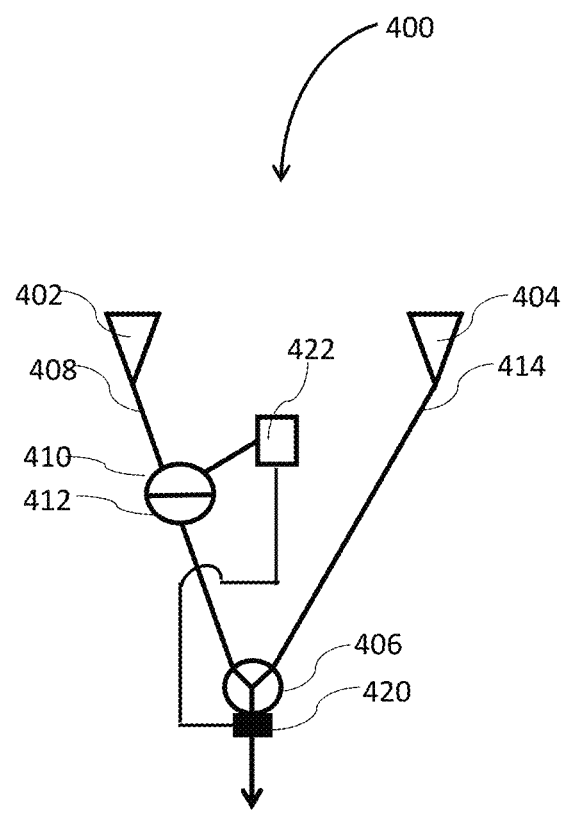
FIG. 4 illustrates an asymmetric CBW-tunable canceller.

FIG. 4 diagrams an asymmetric canceller 400 comprising a first antenna 402 connected to the system combiner 406 via a first signal path 408 and at least one second antenna 404 connected to the combiner 406 by an at least one second signal path 414. First signal path preferably comprises a first delay element 410 connected between the antenna 402 and a first PR 412 that is further connected to the system combiner 406 which is further connected to the system controller via a power detector 420. Second signal path 414 may differ from first signal path 408 in a number of ways. For example, DE 410 may provide a fixed delay or a plurality of more widely spaced delays vs. the 2 pc resolution of the preferred embodiment. DE 410 is any type that can provide a TDOA less than 5 nanoseconds at UHF or higher frequencies. Proportionately greater TDOA is acceptable at lower frequencies, e.g. 433 MHz. And, the PR 412 may be of switchable vs. continuously tunable type.

Figure 5:
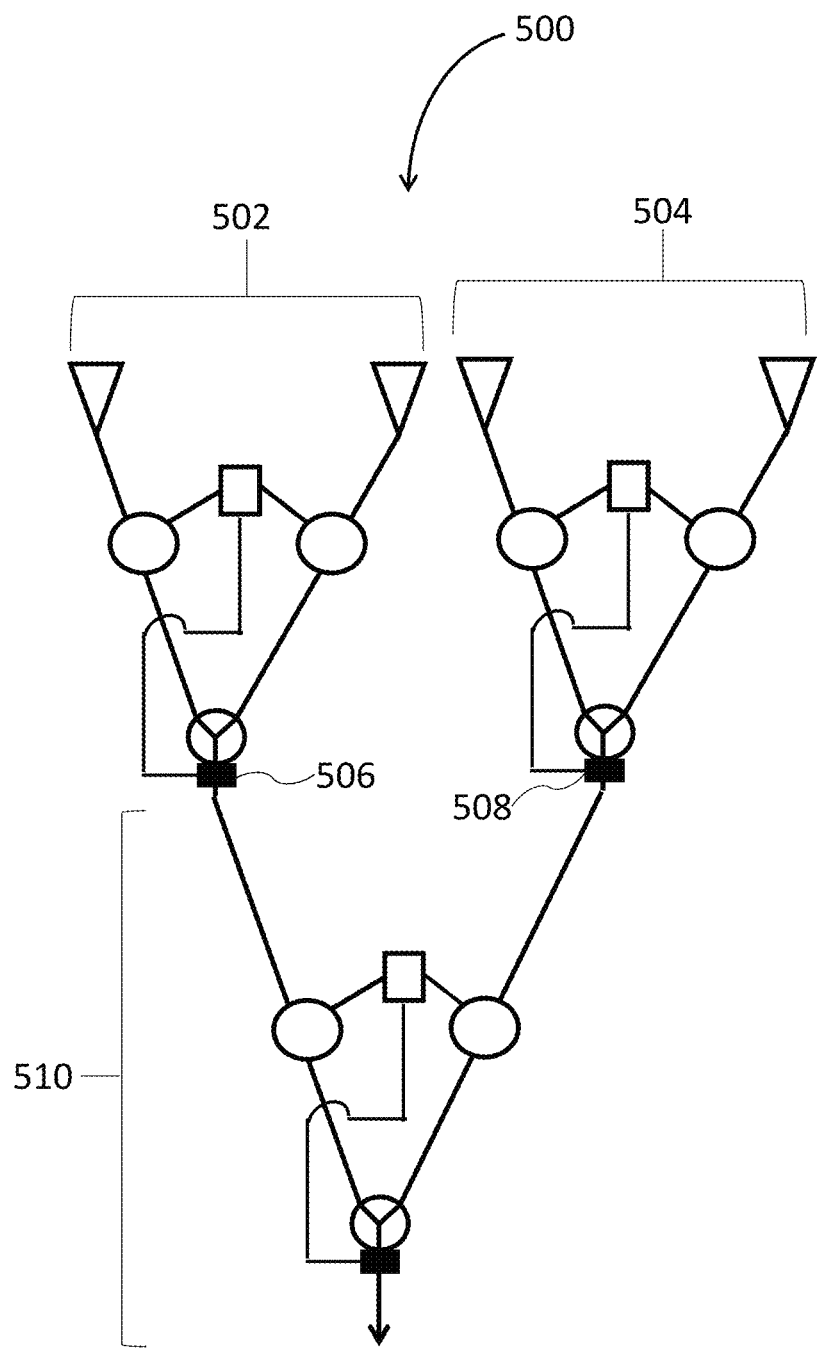
FIG. 5. Illustrates a multi-stage CBW-tunable canceller.

FIG. 5 diagrams a staged, or cascade type, canceller 500 comprising a first canceller 502 and a second canceller 504 the output signals of which are combined to additionally cancel jamming, either further cancellation of a first jammer or cancellation of a second jammer not substantially cancelled in the first canceller or second canceller. First canceller 502 may be of symmetric or asymmetric design. Second canceller 504 may be of symmetric or asymmetric type. In some cases, signals from first power detector 506 and second power detector 508 are detected and amplitude equalized, the amplitude of the equalized signals and the amplitude of the output signal from the third combiner 510 used to calculate phase rotation according to the method in U.S. Pat. No. 9,519,062 to be applied to first combiner output signal supporting antiphase aligning of the output signals from the first combiner and second combiner to conduct the addition jammer cancellation.

Figure 6:
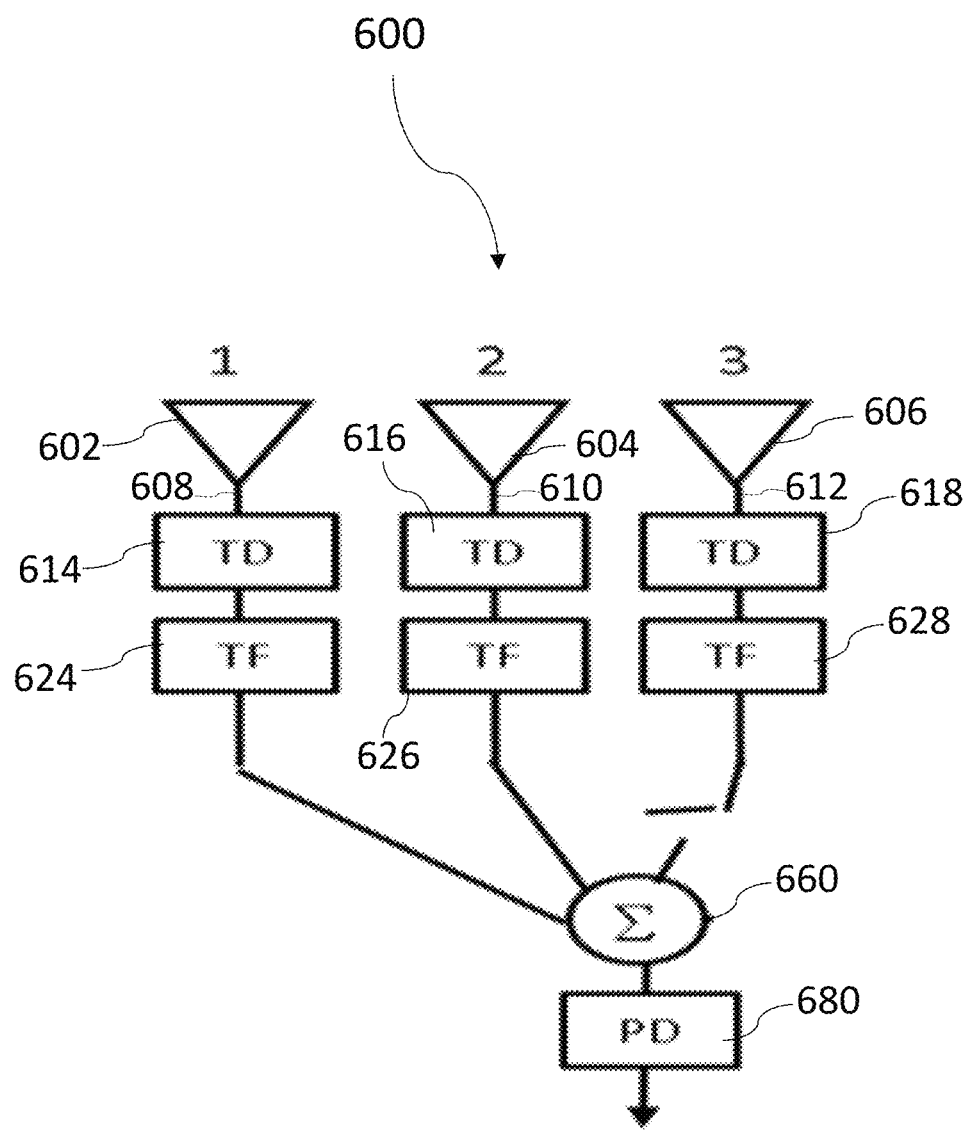
FIG. 6 illustrates a CBW-tunable CRPA.

FIG. 6 illustrates a CBW-adjustable CRPA-type canceller 600 comprising 3 or more antennas 602, 604, 606 connected separately to the combiner 660 each by a signal path 608, 610, 612 each comprising a transversal filter or other circuit that is operable to modify an antenna signal according to the STAP or other cancellation methodology.

A signal path 608, 610, 612 includes a programmable delay element 614, 616, 618 connected preferably between an antenna and a transversal filter 624, 626, 628 although the delay element 614, 616, 618 can alternatively be connected between the transversal filter 624, 626, 628 and the combiner 660. Each delay element 614, 616, 618 and transversal filter 624, 626, 628 is connected the system controller which is also connected to the signal detector 680. In some cases, the at least one third antenna comprises The at least one third signal path 612 includes a conduction-interrupting switch preferably connected between the transversal filter and the combiner, although locations e.g. proximate the antenna, are also acceptable. The switch is connected to the controller, which is any type that can operate the switch.

In one embodiment, the first signal path 608 and/or the at least one second signal path 610 include an amplitude equalizer. The amplitude equalizer is capable of equalizing the amplitude of the first antenna signal with respect to the at least one second antenna signal. In one embodiment, the amplitude equalizer is operable to equalize amplitude with an accuracy greater than 6 bits. In one embodiment, the accuracy of the amplitude equalization is approximately 7 bits, approximately 12 bits, approximately 16, approximately 24 bits, or is able to be any other value as demanded by the particular application. In one embodiment, a phase rotator included in the first signal path and/or the at least one second signal path also acts as an amplitude equalizer. In one embodiment, the amplitude equalizer includes at least one amplifier, at least one attenuator, and at least one in-phase/quadrature (I/Q) adjuster.

The combiner 660 produces an output signal that is conducted to an amplitude detector 680. In one embodiment, the amplitude detector 680 is connected to a controller operable to adjust the time delay by the first time delay element 614. This provides the system with feedback, allowing it to minimize mismatch between the signals from each antenna by minimizing the TDOA of the system below a desired level, especially as the specific required delay will vary based on the position of the signal source relative to the antennas. In one embodiment, the controller only alters the time delay of the first adjustable time delay element 614, while in other embodiments, it also able to adjust the time delay of one or more of the second adjustable time delay elements 616, 618.

Figure 7:
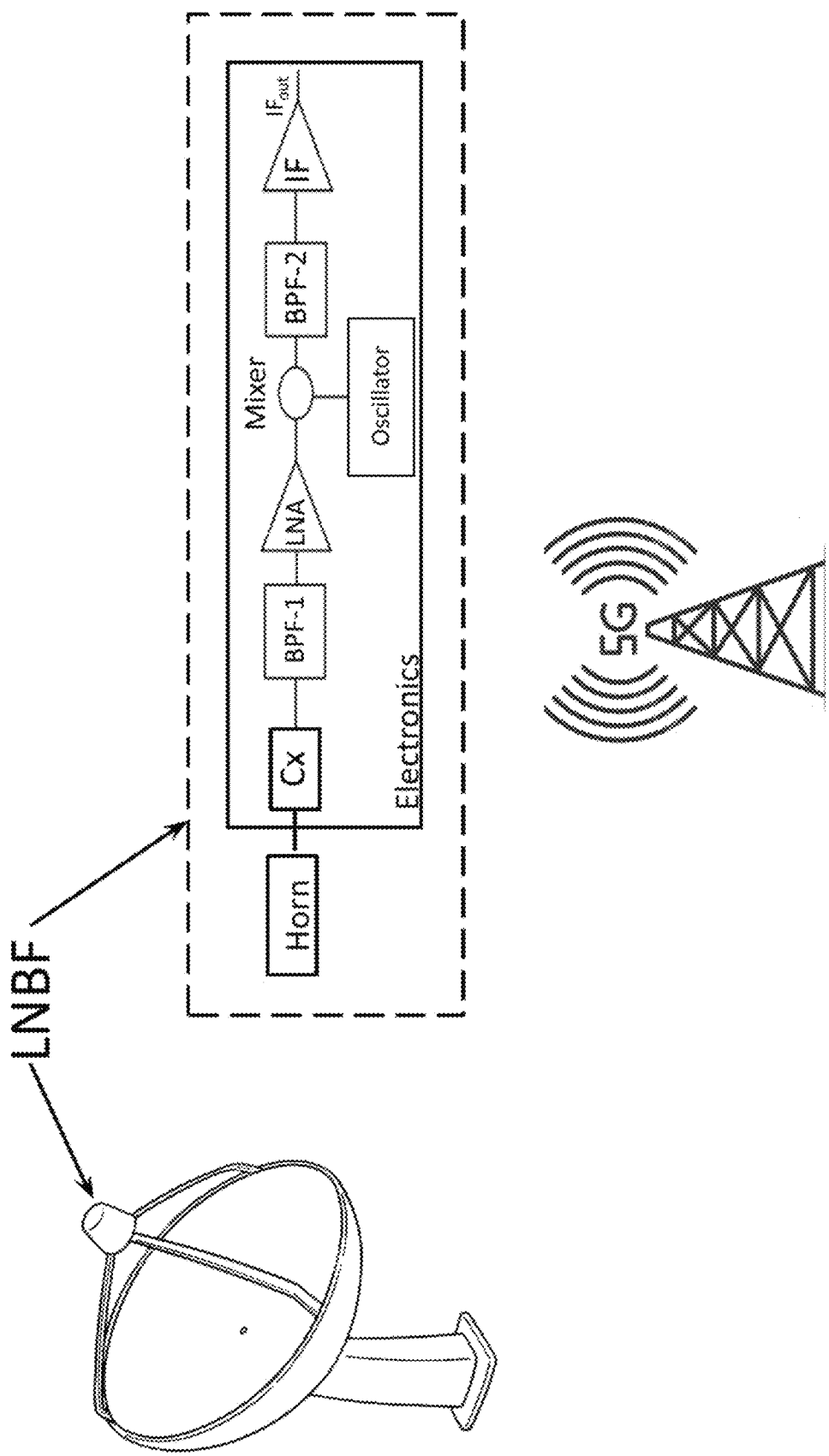
FIG. 7 illustrates a CWB-adjustable canceller Low Noise Block Feedhorn (LNBF).

FIG. 7 illustrates a SATCOM type receiver (LNBF) incorporating a wideband interference canceller (Cx) of the present invention in the electronics portion of LNBF, Cx combining signals from at least one native receive antenna in the horn with signals from at least one secondary antenna (not shown) according to the method of the present invention to selectively cancel interference, such as from a 5G cell tower, for improving reception of SOI from a satellite. For the purposes of the present disclosure, native antenna refers to any LNBF antenna intended to receive SOI with or without the incorporation in LNBF of a secondary antenna. Secondary antenna can be mounted within the horn on its external surface or elsewhere on the LNBF, such as on the outer surface of the electronics portion of LNBF. Secondary antenna can be of any type, by way of example but not limitation, direction or omnidirectional antenna.

Figure 8:
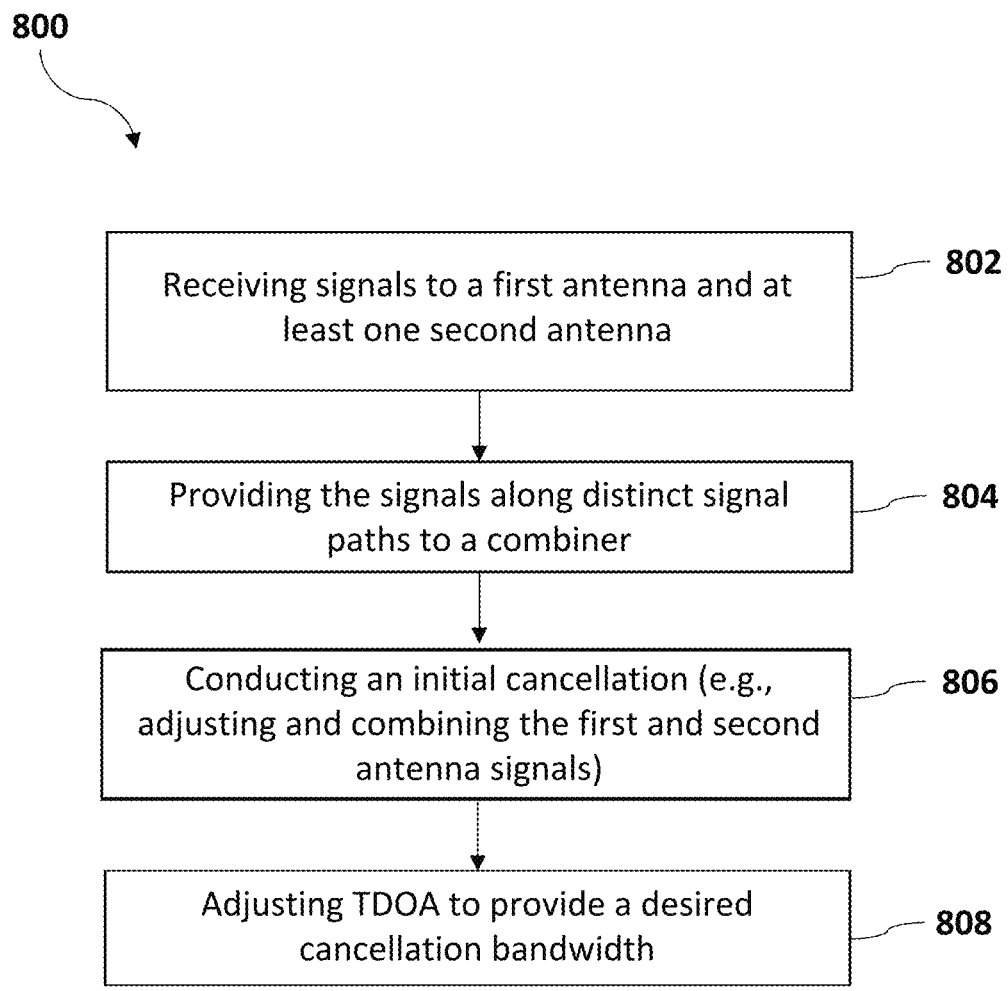
FIG. 8 outlines a method of the invention.

FIG. 8 illustrates an exemplary method of the present invention 800, comprising the sequential steps of: receiving signals to a first antenna and at least one second antenna 802, providing those signals along distinct signal paths to a combiner 804, conducting an initial cancellation (e.g., adjusting and combining the first and second antenna signals) 806, and subsequently adjusting TDOA to provide a desired cancellation bandwidth 808. The direction of arrival of the signals and the spatial configuration of the antennas in the array are utilized to calculate relative arrival times among the antennas in the array. Calculated arrival times are then able to be used to adjust the delay of the one or more antenna signals to provide desired TDOA at the combiner.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A jammer cancelling system comprising:
a cancellation bandwidth (CBW)-adjusting controlled radiation pattern antenna (CRPA) type canceller, and
a first antenna connected via a first signal path to a combiner, the first signal path incorporating a first adjustable delay element connected in series with a phase rotator and a transversal filter, and
at least one second antenna connected to the combiner via a second signal path, the second signal path incorporating a second adjustable delay element connected in series with a controllable transversal filter, and
wherein the second signal path further includes a controllable conduction interrupting switch, and
a power detector connected to the output of the combiner, and
a system controller connected to the first signal path, the second signal path, and the power detector, and
the resulting system providing CBW-adjusted jammer cancelling nulls.

2. The system according to claim 1, wherein the second adjustable delay element includes at least one type of fixed and adjustable.

3. The system in claim 2, wherein the second signal path incorporates a phase shifter connected in series with the second adjustable delay element.

4. The system according to claim 1, wherein the phase rotator is of I/Q type that is operable to adjust the amplitude of I and Q channels to provide phase rotation of the resulting signal with a resolution of 0.1 degrees.

5. The system according to claim 1, wherein the first adjustable delay element and the second adjustable delay element are operable to provide a delay with a resolution as fine as 2 picoseconds.

6. The system according to claim 1, wherein the system controller is operable to adjust the first adjustable delay element and/or the second adjustable delay element for providing a time difference of arrival (TDOA) providing a preferred cancellation bandwidth.

7. The system according to claim 1, comprising a staged design wherein the output of the combiner and an output of a second combiner are connected respectively via the power detector and a second power detector to a third combiner, wherein an output of the third combiner is connected to the system controller via a third power detector, wherein the output from the combiner is combined with the output from the second combiner which outputs serve as inputs to a second-stage combiner.

8. The system according to claim 1 wherein the first adjustable delay element and the second adjustable delay element has a resolution between 20 and 200 picoseconds.

9. The system according to claim 1, in which the first antenna is connected to the combiner by the first signal path, the at least one second antenna is connected to the combiner by the second signal path, and at least one third antenna is connected to the combiner by at least one third signal path, the first signal path, the second signal path and the at least one third signal path each comprising an adjustable delay element connected in series with a transversal filter.

10. The system according to claim 9, wherein the at least one third signal path further comprises a switch connected to the system controller.

11. The system according to claim 9, wherein signals conducted by the at least one third antenna are interrupted and signals from the first antenna and the at least one second antenna are used to determine which information is provided to the system controller for use in adjusting time differences of arrival and/or calculating weights to be applied to signals in transversal filtering.

12. The system according to claim 1, wherein the first signal path or the second signal path further comprises a coarse-adjustable delay element connected to the system controller for coarse adjusting a time difference of arrival (TDOA).

13. The system according to claim 1, wherein the system has an asymmetric design, wherein the second signal path comprises an intrinsic delay matching element.

* * * * *